M. G. STEWART.
SHOCK ABSORBER FOR VEHICLES.
APPLICATION FILED APR. 4, 1913.
1,115,746.
Patented Nov. 3, 1914.
2 SHEETS—SHEET 2.
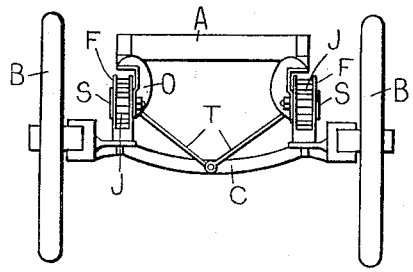
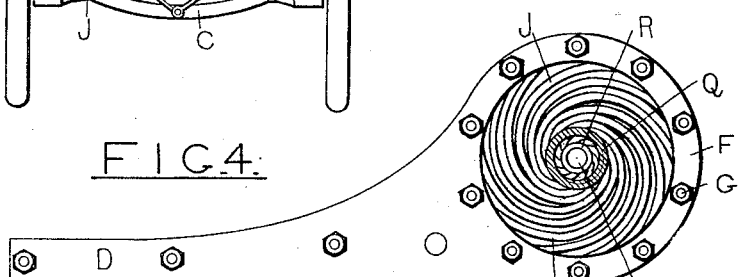
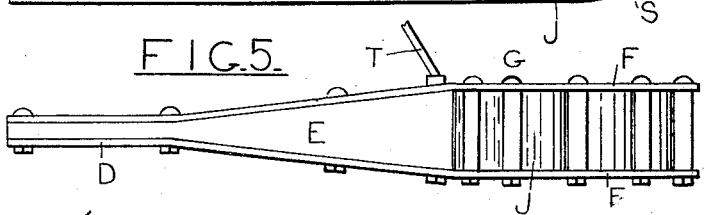
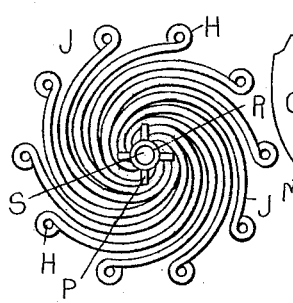 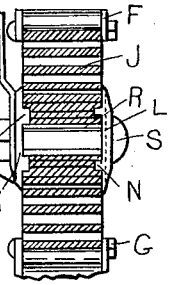 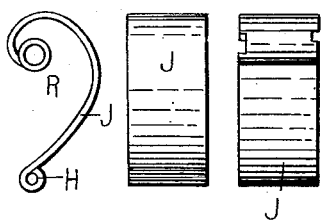
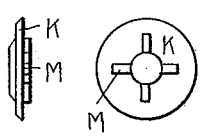 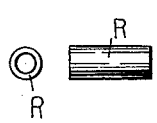 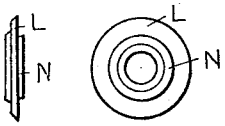
Witnesses:—
C. B. Crompton
John A. Percival
M. G. Stewart,
Inventor.
By Croydon Marks
Attorney.

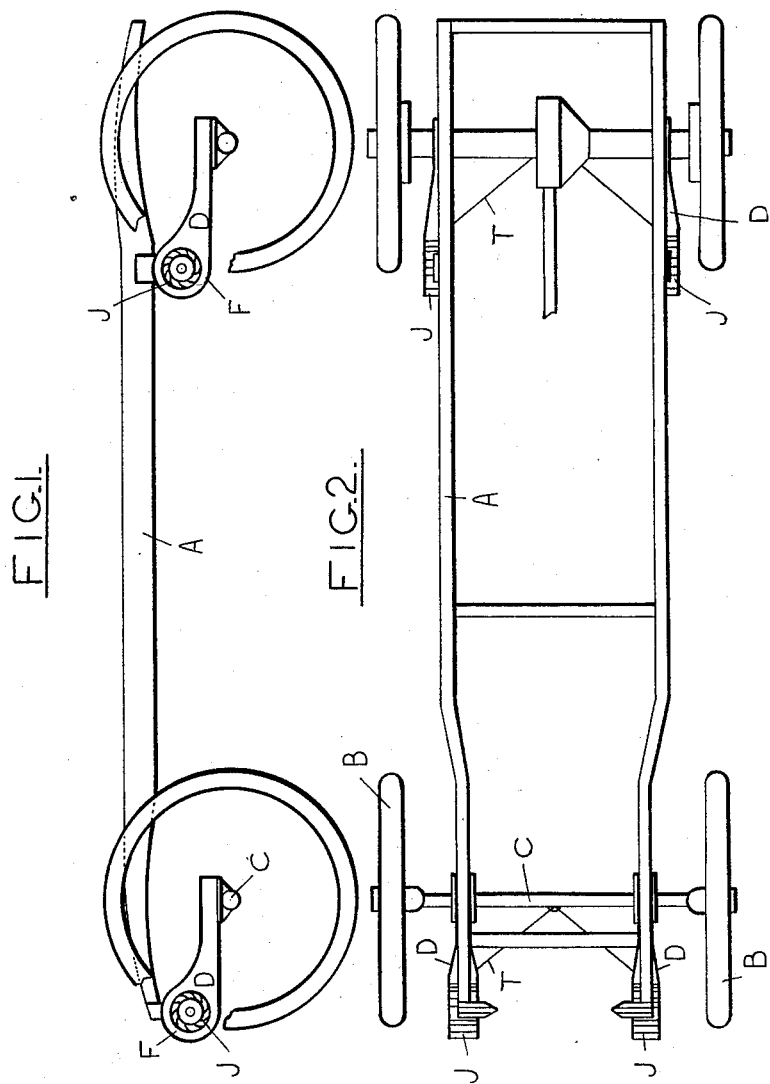

ically applied, Fig. 6 a
UNITED STATES PATENT OFFICE.

MAXWELL GRAHAM STEWART, OF ADELAIDE, SOUTH AUSTRALIA, AUSTRALIA, ASSIGNOR TO WILLIAM ALBERT CLUTTERBUCK, OF ADELAIDE, AUSTRALIA.

SHOCK-ABSORBER FOR VEHICLES.

1,115,746.      Specification of Letters Patent.      Patented Nov. 3, 1914.

Application filed April 4, 1913. Serial No. 758,891.

*To all whom it may concern:*

Be it known that I, MAXWELL GRAHAM STEWART, a subject of the King of Great Britain, residing at Hindley street, Adelaide, in the State of South Australia, in the Commonwealth of Australia, have invented certain new and useful Improvements in Shock-Absorbers for Vehicles, of which the following is a specification, reference being had therein to the accompanying drawings.

This invention relates to certain improvements in road wheel vehicles and cognate tractors, especially motor cars, and is applicable to all classes of engines or machines employed as tractors, and vehicular constructions employed as carriers, which are subjected to an irregular vibration, or to jolting shocks intermittently from obstructions.

Its objects are to provide a means for the more even running of the vehicular construction, whereby the jolting of the primary driver or road wheels, shall be absorbed and compensated, with the result that the quiesence of the body shall be disturbed to a minimum degree or not at all, while the obstruction is being overridden.

I accomplish my objects by the hereinafter described intermediary device, or arrangement of assembled parts, between the chassis or body of the vehicular construction, and each of its wheels or primary drivers, wherein the vibrations or jolting shocks of uneven rotation, are transmitted to an angularly set radius arm, and, from thence, absorbed, or compensated, and exhausted, by an assembly of springs, which, during the variations of the leverage of the radius arm, or during the uneven varied movement of the outermost fixings, are together in relation to a common fixed center, or central attachment, twistingly wound and returned, throughout the intermediate length of curvature, in a more or less semi-rotary motion; wherefrom the shocks directly conveyed to the curvature of any one spring, from any direction of impact, are diverted and nullified, or compensated by its oppositely arranged fellow, reacting in the opposite direction; during which movement, the body of the vehicle through its fixed center, elastically floats about the center of the rims, independently of the rotary play within the springs, in compensating shocks, with the floating position or eccentric movement of the body, in relation to the rims, being axially governed by the elasticity of the springs.

Referring to the accompanying illustrative drawings—Figure 1 is a side elevation, and Fig. 2 a plan, and Fig. 3 a front view of a chassis of a motor car to which my improvements have been applied, Fig. 4 a side elevation, and Fig. 5 a plan of the radius arm within the rim of which a series of springs is internally applied, Fig. 6 a side elevation of the springs, showing their turned ends, with keyways and assembled parts relatively to the fixed center, Fig. 7 a cross section of Fig. 4, with the ends of the radius arm omitted, to illustrate the attachment of the springs, Fig. 8 side, back, and front views, respectively, of a spring showing its position of attachment relatively to the central assembling bolt and sleeve, Fig. 9 side, and front views, respectively, of the inner flange K with keys, Fig. 10 side, and front views, respectively, of the sleeve R, and, Fig. 11 side, and front views, respectively, of the outer flange L with key.

A represents the chassis or body of a vehicular construction.

B is a primary driver or road wheel, upon its axle or spindle C.

D is the radius arm, which preferably comprises two corresponding sufficiently spaced apart plates, which, with a wooden filling piece E between, if necessary, in their lower tapering portions, are clamped or bolted to the axle C, with a strengthening stay T between the arm and axle, and in their upper portions terminate in circular rims F, between which is affixed an assembled series of springs J.

The springs are preferably C or scroll shaped, and of steel or other sufficiently pliable material, as will allow the intermediary bended length of curvature to intermittently expand and contract, or be twisted and returned, or be bent relatively to a fixed common center, and returned to the normally set position, without cleavage or breakage, with the joltings, and variations in leverage, from the rotary movement of their outermost fixings.

Each spring is preferably of the same shape, and is affixed to the rims, by a bolt G through an eye H turned in its outermost end, and has its inner end curved, and the tip beveled, for engagement with a central sleeve R, which is applied after the series have been assembled, by a taper mandrel, to form a central cavity through which the assembled parts are bolted to the body of the vehicular construction.

The springs are therefrom assembled, the one within or between another or others, upon either side, from the rim to a central circular cavity as one common center, formed by the series of beveled points which tightly grip the sleeve R, at an encircling point preferably about midway upon the other side, to that of the bolt upon the rim, to which its outer end is affixed, whereby the beveled ends of the series, are tightly gripped or compressed by the sleeve R, and at the common center practically form one solid laminated mass or boss, from which each member extending radially backward, or involutely outward, gradually diverges the wider apart to its own particular outer fixing G, upon the rim F, wherefrom the shocks directly conveyed to the curvature of any one spring from any direction of impact, are diverted from the body of the vehicle, and absorbed or exhausted, and nullified or compensated, by its oppositely arranged fellow reacting in the opposite direction, within and through the lengths of curvature of the springs working together in a more or less semi-rotary motion irrespective of the direction from which they are received.

It will be obvious that this intermediary assembling of parts, permits of very great variations, within the spirit of our invention, as between the divergence of each spring, J, from the common compressed center to the rim, a distance space is provided of a maximum area at the outer portions, which is gradually lessened toward the center, wherefrom a maximum latitude is provided for the play of compression and return to their normal position, of the curvature or bended portion, in absorbing or compensating the joltings; and that the capacity or degree of play or compression, may be regulated within a large compass, according to the intended weight or load, by varying either the number or contour, or dimensions of the springs; and that each spring will receive, obstruct, absorb, and compensate the joltings through its fellows, in a semi-rotary motion, wherefrom the irregularity or unevenness in traveling of each wheel is intercepted and diverted from the body of the vehicle.

To prevent the assembled springs from central or other undesirable movement, under stresses, I employ inner and outer flanges K and L which may extend any distance from the center toward the rim F, and be provided with suitable projections M and N upon their innermost faces, which key the springs, and are clamped together through the cavity of the sleeve R by a main pin S, at the back of a fixed bracket O by a nut, wherefrom the assembled parts are readily adjusted.

The inner flange K is fixed to, and preferably cast upon the bracket O, bolted to the frame of the vehicle, and its projections M, prevent the springs rotating as a body, relatively to the bracket O in the fixed center, by engaging corresponding keyways or recesses P, which are made by slotting the springs when assembled.

The outer flange L is independently applied, and upon its inner face carries a circular projection N, to engage a corresponding recess Q upon the outermost face of the springs J, to prevent them from being drawn bodily outward under stress; which recess Q is similarly channeled to the recess P upon the other and innermost face of the springs.

To angularly set or adjust the radius arm D, and the play of the springs relatively to the center according to requirements, the body of the vehicle is first lifted, the main pin S is withdrawn free of the outer flange L, and the radius arm D and springs J then drawn forward from the keys M in the fixed flange K. The radius arm D is then raised or lowered, and with a reverse or inward pressure is gradually returned into contact with the keys M. In the new position, it is only necessary to apply and tighten the main pin S, for the chassis A to be raised or lowered relatively to the axle; or, the radius arm D adjusted relatively to the common center; or, the springs J as a body, turned or twisted relatively to the bracket O; for varying the play for varying loads, and to secure an even and comparatively equable running of the chassis or body.

It will be clearly understood that my invention, and its assembled parts, is applied to each wheel or primary driver of the vehicle, and generally at either side is in pairs upon the same axle, and that any irregularity or unevenness in traveling, is absorbed or exhausted and compensated by each of the intermediary devices, independently and internally within the springs throughout the oscillatory curvature of their lengths.

As a variation of my invention, each spring may be independently applied along a transverse shaft parallel with the axle, and be suitably connected with the traveling axle; or, the plates forming the radius arm, may in their projecting lengths so relatively extend, as to permit of one constituting the radius arm connected to the axle, and the other a bracing stay, wherefrom the filling piece is dispensed with; or, in lieu of the wooden filling E fully extending between the two plates of the radius arm, one or more of the springs may extend from the rim F and have its outer extremity suitably affixed to the axle, thereby constituting a spring arm.

What I claim as new and desire to secure by Letters Patent is:—

1. In a shock absorber for vehicles a cushioning member consisting of a series of substantially involute-shaped springs interposed between the axle member and the body member of the vehicle, the inner ends of said springs being adjacent one another and connected to one of said members, and the outer ends being circularly disposed and connected to the other of said members, each of said springs being of gradually increasing radius from its inner end to its outer end and also extending from one side of the center of the cushioning member to the other side thereof.

2. In a shock absorber for vehicles, a cushioning member consisting of a series of substantially involute-shaped springs having their innner ends adjacent and their outer ends circularly disposed, being of gradually increasing radius from its inner end to its outer end and also extending from one side of the center of the cushioning member to the other side thereof, a radius arm carried by the axle member of the vehicle at one end and having a rim at the other end to receive said cushioning member, and means for mounting the inner ends of the springs upon a member carried by the body of the vehicle.

3. In a shock absorber for vehicles, a cushioning member consisting of a series of substantially involute-shaped springs having their inner ends adjacent and their outer ends circularly disposed, being of gradually increasing radius from its inner end to its outer end and also extending from one side of the center of the cushioning member to the other side thereof, a radius arm carried by the axle member of the vehicle at one end and having a rim at the other end to receive said cushioning member, a sleeve passing through the center of said cushioning member and against which the inner ends of said springs abut, and a bolt member passing through said sleeve to secure it to the body member of the vehicle.

4. In a shock absorber for vehicles, a cushioning member, consisting of a series of substantially involute-shaped springs having their inner ends adjacent and their outer ends circularly disposed, being of gradually increasing radius from its inner end to its outer end and also extending from one side of the center of the cushioning member to the other side thereof, a radius arm carried by the axle member of the vehicle at one end and having a rim at the other end to receive said cushioning member, a sleeve passing through the center of said cushioning member, beveled ends to said springs which abut against, and tightly grip said sleeve, flanges having projections for engaging and clamping the edges of the inner ends of the springs together, and a bolt member passing through the sleeve and carried by the body of the vehicle.

5. In a shock absorber for vehicles, a cushioning member, consiting of a series of substantially involute-shaped springs having their inner ends adjacent and their outer ends circularly disposed, being of gradually increasing radius from its inner end to its outer end and also extending from one side of the center of the cushioning member to the other side thereof, a radius arm carried by the axle member of the vehicle at one end and having a rim at the other end to receive said cushioning member, turned over outer ends to said springs for securing the same to the rim, a sleeve passing through the center of said cushioning member, beveled ends to said springs which abut against and tightly grip said sleeve, flanges having projections for engaging and clamping the edges of the inner ends of the springs together, and a bolt member passing through the sleeve and carried by the body of the vehicle.

In testimony whereof I have affixed my signature in presence of two witnesses.

MAXWELL GRAHAM STEWART.

Witnesses:
CHARLES STANLEY BURGESS,
DAVID JAMES SHORT.